3,269,025
FREEZE-DRYING METHOD UNDER HIGH VACUUM UTILIZING A FLUIDIZED BED
Charles E. Dryden, William H. Mink, and Herman Nack, Columbus, Ohio, assignors, by mesne assignments, to The Battelle Development Corporation, Columbus, Ohio, a corporation of Delaware
No Drawing. Filed May 21, 1962, Ser. No. 196,525
11 Claims. (Cl. 34—5)

This invention relates to a process of drying by fluidizing particles of a frozen material at atmospheric pressure or below with a substantially dry gas. More particularly, the process relates to sublimation of ice from fluidized, discrete particles of a food, which is frozen solid, under a water vapor partial pressure of less than 4 millimeters of mercury and an appropriate temperature.

Drying of materials by sublimation of their ice content commonly is known as "freeze-drying." In freeze-drying, a material, such as a food, to be treated is frozen and, while frozen, is subjected to low pressure conditions so that the water present as ice is removed by sublimation. Advantageously, freeze-dried food, after proper packaging, can be stored for a long period of time without refrigeration. For consumption, the freeze-dried food is rehydrated by addition of water to replace that water which has been removed in the freeze-drying process. In the rehydrated state, the food is referred to as a "reconstituted" food. The quality, taste, and appearance of a reconstituted food desirably closely approximates the quality, appearance, and taste of the food prior to freeze-drying. Much research has been conducted to develop methods of food processing, so that the food can be stored without refrigeration and then, after storage, be brought to a state substantially indistinguishable from the original food. A number of freeze-drying methods that yield reconstituted food items of reasonable quality have been reported in the art. Illustrative of such a freeze-drying process is that described in U.S. Patent 2,765,236. In general, the prior-art methods require drying times as high as 16 to 24 hours or more to provide a residual moisture content of the food of less than about 2 percent. In a few instances, the literature reports drying times as low as about 8 hours. However, the longer the drying time, the more costly the process, and as a consequence, a relatively minor proportion of today's consumed food is processed by freeze-drying. Substantial reduction of processing time and, consequently, cost in freeze-drying could well result in an immediate widespread use of the freeze-drying process by food processors. Thus, there exists in the art a need for a method which will substantially reduce the drying time while still preserving appearance, taste, and quality of a reconstituted food.

In a freeze-drying process, there are a number of limitations which must be considered. The phase diagram of water defines a pressure-temperature region for sublimation, and such pressure-temperature relationships must be observed in the processing, or sublimation, per se, will not occur. The presently accepted phase diagram for water indicates that ice will sublime at all temperatures when the vapor pressure is not greater than about 4 millimeters of mercury. By present methods, heat transfer to the food being dried limits the drying rate. Drying time of the prior-art freeze-drying methods have been severely limited by the particular method and equipment used, and substantially lower drying times would be obtainable with a more efficient and rapid heat tranfer to the food. Removal of the vapor from the surface of the food being dried also has been a limiting factor in freeze-drying. The removal of vapor, in general, is diffusion-controlled and, at the low pressure necessary for sublimation, requires large vapor paths in the equipment. The prior-art systems neither allowed rapid heat transfer to all surfaces of the material being dried nor did they permit rapid removal of the water vapor from all surfaces. Consequently, the drying was lengthy as the drying rate was far from the theoretical drying rate which could be obtained.

In the copending patent application, Serial No. 187,949, filed April 16, 1962, entitled, "Process for Drying Foods," a method is disclosed for freeze-drying of food by immersing it in a frozen condition in a fluidized bed of auxiliary particles at a subatmospheric pressure. In this method, rapid transfer of heat to all surfaces of the food being dried is accomplished, as well as a rapid removal of water vapor. The present invention provides an improvement of the process disclosed in the copending application. In particular, the present method eliminates the necessity of immersing the food in a fluidized auxiliary bed of solid, discrete particles by eliminating auxiliary fluidized particles and by having the foodstuff, per se, in a particulate form making up the fluidized bed.

It is an object of the invention to fluidize a mass of discrete, frozen-solid particles of a material, which when frozen contains water in the form of ice, while maintaining the fluidized particles in a frozen state and under a water vapor partial pressure of less than about 4 millimeters of mercury and in this manner to dry the material.

It is another object of the invention to provide a method for freeze-drying a solid material containing water by preparing this material in the form of discrete, frozen-solid particles and by fluidizing these discrete, frozen-solid particles by a dry gas while maintaining a vapor pressure of less than 4 millimeters of mercury on the fluidized particles.

It is still another object of the invention to provide a freeze-dried product of excellent storage stability and of excellent qualities when reconstituted, by freeze-drying discrete, frozen-solid particles of a material while the discrete, frozen particles are fluidized by an inert gas having a water vapor partial pressure of less than 4 millimeters of mercury.

It is an additional object to freeze-dry eutectic compositions of liquid water content by fluidizing these compositions in the form of frozen-solid, discrete particles thereof at a water vapor partial pressure of less than 4 millimeters of mercury and at a temperature below the eutectic temperature of the water-containing composition.

It is a further object of the invention to freeze-dry food particles by fluidizing frozen food particles with an inert gas under an absolute pressure of less than 4 millimeters of mercury, while maintaining the frozen food particles in a frozen-solid state and under a water vapor partial pressure of less than 4 millimeters of mercury.

All these and other objects will be more fully apparent from the description which follows.

The process of the present invention comprises fluidizing discrete, frozen-solid particles of a material by a substantially dry gas while maintaining the particles in a frozen state and under a water vapor partial pressure of less than 4 millimeters of mercury on the fluidized particles. In many applications, the process also includes preparing the materials in the form of discrete frozen-solid particles suitable for the fluidizing step. The process also includes the freeze-drying of water-containing materials in the form of eutectic compositions and, when treating such materials, the fluidizing, in addition to being carried forth at a vapor pressure of less than 4 millimeters of mercury, is carried forth at a temperature below the eutectic temperature of the composition being dried.

A sequence of steps comprising one embodiment of the process is illustrated diagrammatically by the following block-flow diagram:

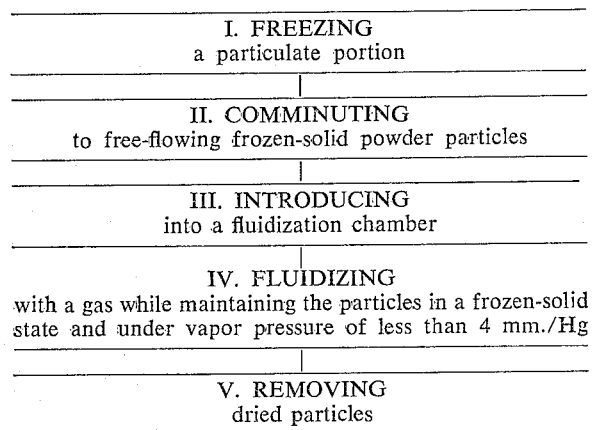

I. FREEZING
a particulate portion

II. COMMINUTING
to free-flowing frozen-solid powder particles

III. INTRODUCING
into a fluidization chamber

IV. FLUIDIZING
with a gas while maintaining the particles in a frozen-solid state and under vapor pressure of less than 4 mm./Hg V. REMOVING
dried particles In another embodiment, a mass of discrete frozen-solid particles of a suitable size for fluidization already is present in a suitable fluidization apparatus, and in this embodiment the method comprises steps IV and V of the preceding block-flow diagram.

All materials which, when frozen, contain water in the form of ice may be freeze-dried by this process. The process is particularly applicable to foods, both liquid and solid. Fruits, vegetables, meats, fish, and the like, may be freeze-dried by the process. Even many foods that are normally liquid may be frozen and then freeze-dried by the process. The more common of these are fruits and vegetable juices, soups and bouillons, coffee extracts, tea, and milk. The process also is readily adaptable to materials other than foods which, when frozen, contain water in the form of ice. Illustrative of such aqueous materials are vitamin solutions, compositions containing natural flavors and oils, blood plasma, pharmaceutical products, biological materials, and the like.

Preliminary to placing the frozen water-containing material in a fluidized state and drying the fluidized material, the material is frozen and, if necessary, reduced to a particle size suitable for fluidization. In general, fluidization of a particulate material is possible with particles of the material as small as about 5 microns in size, and with particles up to as large as several inches in their largest dimension. In many instances, and particularly with some foods, the water-containing material itself is of a natural form and size suitable for fluidization. Such foods as vegetables, and to name a few, peas, corn, green beans, lima beans, and most fruits, such as cherries, berries of all kind, and the like, require little or no size alteration before fluidization. Fluidization of these materials is possible in an apparatus of suitable size by passage of a requisite amount of the fluidizing gas therethrough. Other materials, such as large, bulky solids and liquid foods, generally have to be put into a discrete particulate form suitable for fluidization. In general, these materials may be diced, chopped, ground, powdered, pulverized, granulated, and, in numerous conventional manners, placed in a discrete, particulate form suitable for fluidization. While the reduction of the material to form a suitable fluidization may be carried out prior to freezing of the material, generally the material is frozen and then, while frozen, comminuted or otherwise reduced to a suitable particle size for fluidization.

In any event, the material is frozen prior to fluidization. The material may be frozen by the method disclosed for food in a copending patent application, Serial No. 817,091, now U.S. Patent 3,035,918, namely by immersing the food in a fluidized bed of solid, discrete particles maintained at a temperature below 0° C. The material to be frozen may be mixed with an inert volatile refrigerant, such as a Freon refrigerant, and this mixture introduced into a cyclone separator, where a direct expansion of the refrigerant cools and freezes solid the material. Such a freezing method is particularly useful with aqueous slurries and solutions. The material also may be frozen solid in any conventional manner known to the art for rapid freezing of materials. Such methods usually involve a rapid chilling and freezing of the material by a cold environment or by contact with a refrigerated surface.

In the process, the freeze-drying is carried forth by fluidizing frozen-solid, discrete particles of the material. Fluidization of these frozen-solid, discrete particles of the material is by upwardly flowing a gas therethrough. The size and weight of the particles and the velocity, nature and amount of the fluidizing gas are so chosen that the force asserted by the current of fluidizing gas is sufficient to counterbalance the gravitational force on the free particles and to expand the bed, thus allowing movement of the particles, but is insufficient to convert the bed into a stream of entrained particles. A bed of such fluidized, frozen-solid, discrete particles subjected to, and expanded by, such an upward gas current in the manner described is understood in the art to be a "fluidized bed." While fluidized beds, per se, are known and used in many areas of technology, a vacuum freeze-drying of particulate materials in a fluidized bed is believed not to be heretofore taught. Surprisingly, fluidization of frozen-solid, discrete particles at a reduced pressure well below atmospheric pressures is possible. The reduced pressure does not interfere with the fluidization of the particles and fluidization of the particles at a reduced pressure sufficient for freeze-drying is possible. This result is believed not to be predictable from the art. Moreover, when vacuum freeze-drying is carried forth by fluidization of the materials being freeze-dried, surprising results are obtained.

Since the most appropriate materials for freeze-drying usually are materials which, if dried in a manner other than by vacuum freeze-drying, lose flavor, taste, quality, or degrade in some manner, so that they are incapable of reconstitution to a form and quality indistinguishable from that prior to freeze-drying, it is particularly important that care be used in selection of the materials of construction from which the fluidization chamber and component parts are constructed. In most instances, a food product is involved and that portion of the system coming in contact with the food must be constructed of materials suitable for food preparation. Health authorities can readily provide a list of approved materials for food preparation, and many of these are useful construction materials for the fluidization chamber. In general, materials, such as a metal, stainless steel, aluminum, porcelain-coated metals, glass, and the like, which are conventional for the cooking of foods, are suitable materials for construction of a fluidization chamber.

The gas used to fluidize the particles in the bed should not render inedible the material to be dried if it is a food, or, if it is another material, should not substantially react with the material being dried. Many gases are suitable for this purpose. Included among these gases are air, nitrogen, carbon dioxide, and flue gas. Where it is desired to inhibit oxidation of a food being treated, a nonoxidizing gas, and most desirably an inert gas, should be used. Nitrogen and carbon dioxide are most suitable in this instance. To minimize processing costs, the fluidizing gas may be circulated through a closed system and then may be recycled through the bed. Since it is desired not to add water to the product being treated, the introduced fluidizing gas should be maintained in a reasonably dry condition and at all times should be of a water vapor partial pressure of less than 4 millimeters of mercury. Suitable drying means for the useful gases are well known to the art. For example, drying may readily be accomplished by passing a gas, such as nitrogen, through a chemical drying agent, before the nitrogen is introduced into the fluidization chamber and/or recirculated through the fluidization chamber for fluidization of the particulate material.

The phase diagram of water defines a pressure-temperature region where sublimation of ice will occur; that is, ice will change directly to vapor without passing through the liquid phase. The sublimation of ice is the foundation of the freeze-drying process. The phase diagram of water shows that at a vapor pressure of not greater than 4 millimeters of mercury, ice will sublime to vapor. Thus, during the drying, the vapor pressure in the fluidized bed chamber should not be greater than about 4 millimeters of mercury. Such a vapor pressure can be readily obtained and regulated by maintaining the absolute pressure in the fluidized bed at not greater than about 4 millimeters of mercury and/or by using a substantially dry gas for fluidizing the particles. The only pressure limitation imposed on the process is that imposed by the phase digram of water. Most desirably, the absolute pressure in the fluidized bed chamber is maintained at below-atmospheric pressure, and preferably at less than about 4 millimeters of mercury. This makes the process more economical by permitting fluidization with a smaller quantity of gas than when above-atmospheric pressures are employed. Practical and economic considerations, such as the size and cost of the vacuum means, dictate that the fluidization chamber rarely is maintained at an absolute pressure lower than about 0.001 millimeter of mercury. Conventional vacuum techniques and equipment can be used to achieve a desired reduced pressure in the fluidization chamber. The freeze-drying step of the process also is carried out, in addition to the vapor pressure limitation, at a temperature at which solid ice will sublime. In general, another limitation on temperature is that the particles of the material to be dried must remain in a frozen state during the drying, with little or no melting and collection of moisture or the like, on their surfaces, during the fluidization so that particle agglomeration and complete loss of fluidization does not occur. With some materials, such as liquid foods, for example, orange juice, the orange juice comprises a eutectic composition having a eutectic point or temperature of about −25° C. When freeze-drying frozen-solid, particulate, orange juice, it is necessary that the freeze-drying of the fluidized particle be carried forth at a temperature lower than the eutectic temperature of −25° C. If the temperature is not maintained below −25° C., sufficient melting of the orange juice may occur that loss of fluidization results. Also the resulting dried orange juice product is tacky and is not readily rehydrated to a palatable reconstituted product. When, in addition to the vapor pressure limitation, the eutectic temperature limitation also is observed, eutectic compositions in a frozen, particulate form are readily fluidized and vacuum freeze-dried to unique products which can be stored for lengthy periods of time without refrigeration and which also can be readily rehydrated to reconstituted products closely approximating and, in many instances, indistinguishable from the original eutectic composition. Heat of sublimation for the ice content of the fluidized particles may be supplied in any of several ways. For example, the fluidized particles may have heat added to them by controlling the temperature of the fluidizing gas introduced into the fluidizing chamber. Heat for sublimation also may be introduced through the walls of the fluidizing chamber, or by heating coils immersed in the bed of the fluidizing chamber, or by heating the particles themselves through radiant heat, dielectric heating, conduction heating, or the like. In general, any means known for heating fluidized particles may be used to introduce heat of sublimation of the ice, providing the introduced heat is of an amount insufficient to cause a melting of the frozen particles and a resulting agglomeration and loss of fluidization of the particles. In the fluidized bed, a fluidized particle being dried is contacted on all sides by other fluidized particles of the bed and by the fluidizing gas. It is this intimate contact that produces a heat-transfer rate and drying rate that are vastly superior to the rates obtained by other known methods of freeze-drying. As is recognized in the freeze-drying art, care must be employed when heat is introduced to expedite sublimation of the ice to avoid introducing heat in an amount sufficient to scorch or denature the product being freeze-dried. The vapor liberated from the ice during the freeze-drying is continuously removed by the fluidizing gas which exits from the fluidized bed. It has already been mentioned that this fluidizing gas can be redried and recirculated. The exiting fluidized gas also may be utilized for other purposes known to the art for such gases.

In practice of the process, frozen-solid, discrete particles of material are placed in a fluidization chamber. The introduction of the particles may be either continuously or in a batch fashion. In a batch-type operation, the frozen particles introduced into the chamber are brought under a suitable reduced pressure and fluidization of the particles commenced by introduction of the fluidizing gas. In most instances, it is desirable that the fluidizing chamber and/or the fluidizing gas be cooled to a temperature below the temperature of the frozen, solid, discrete particles before the particles are introduced into the fluidization chamber. Means are known to the art, such as surrounding of the fluidization chamber by a refrigerant, for bringing the fluidization chamber to a sufficiently low temperature. Similarly, the fluidizing gas introduced may be precooled by passing it through a heat exchanger to lower the temperature of the fluidizing gas to a low enough temperature. Where the fluidization bed chamber is maintained below atmospheric pressure, the frozen, solid, discrete particles may be fed into the chamber by means of vacuum locks. In this situation, the feed may be continuous or batch, as desired. In like manner, the freeze-dried particles may be withdrawn by means of vacuum locks from the fluidization chamber. Thus, it will be readily apparent that the process is readily adaptable to either continuous or batch operation, as desired.

When the residual water content of the particles being dried reaches a desired level, the particles are removed from the fluidization chamber. Generally, for food, a residual moisture content of less than about 7 percent by weight is acceptable, although less than 5 percent by weight is more desirable. It is known that food can be stored for long periods of time with suitable packaging, without deterioration, when it has a residual moisture content of not greater than about 7 percent, and most desirably as low as 2 percent and lower. Where oxidation of the freeze-dried material would reduce its quality or shelf life, or otherwise be detrimental, the chamber from which the material is removed, after drying, can be brought to atmospheric pressure by means of a non-oxidizing gas, in a batch-type operation, and the material removed and stored under such unoxidizing gas. Gases, such as nitrogen and carbon dioxide, are especially suitable for this purpose. Also, the material and the container in which it is to be packaged or stored can be flushed with such an inert gas when the material is sealed in the package. With food in particular, it is undesirable to have substantial quantities of moisture contact the dried food prior to the time that it is to be reconstituted. Thus, a substantially dry gas should be used, in a batch-type operation, to flush out the removal chamber and to surround the food, after freeze-drying, up to and during packaging to maintain the freeze-dried food in substantially dry condition.

Materials freeze-dried by the process can be packaged for storage in containers that are presently available for freeze-dried foods. It is important and desirable that the container act as a moisture barrier to prevent pickup of moisture by the material. Where oxidation of the material would be deleterious to the material during its storage, the container also should be a barrier to oxidizing gas, such as oxygen. Most metal cans and glass jars, as well as some metal foil and plastic containers, meet these requirements. To prepare the material for reuse, or, in the case of food, for consumption, it is only necessary to open the container and to replace the water that has been removed by the freeze-drying. Methods for reconstitution of freeze-dried materials are known. Methods used for rehydrating conventional freeze-dried foods are applicable to the freeze-dried foods prepared by the present process. For example, immersing the food in water for approximately 15 to 30 minutes will restore it to its original moisture content or nearly so. In some instances, stirring and mixing of water with the freeze-dried particles and/or a slight heating or cooking of the freeze-dried particles is desirable to rapidly restore the original moisture content of the food. Where special effects are desired, liquids other than water may be used to reconstitute the material. For example, with food, meats may be reconstituted using wines of various flavors and types; milk also may be used to reconstitute other foods instead of water. Other liquids and seasonings used in cooking and food flavoring can be added to the food, when it is reconstituted, in various amounts, as desired, in much the same manner.

The specificity of the examples, which follow, is for illustrative purposes and it is not intended by these examples to limit the invention to other than its true scope. In these examples, which follow, there is employed a vertically positioned, generally cylindrical column enclosing a chamber for fluidization and vacuum freeze-drying of frozen particulate materials. The column is provided, near its top, with a means for introduction of a frozen particulate material and for subsequent sealing of the column after introduction of the frozen particulate materials to be dried. Also provided at the top of the column is a conduit to a means for evacuating and maintaining a suitable reduced pressure within the column. Near the bottom of the column, there is provided a porous, perforated distributor plate. Directly below the distributor plate is provided a means for introduction of a gas for fluidizing the frozen particulate material in that portion of the column directly above the porous distributor plate.

*Example 1*

Commercially available skim milk of a 1.75 percent by weight butterfat content is added dropwise to liquid nitrogen and allowed to remain in the liquid nitrogen until the added droplets are thoroughly frozen. The frozen milk droplets then are removed from the liquid nitrogen and rapidly crushed in a cold mortar and pestle which has been precooled by immersion in liquid nitrogen just prior to crushing of the frozen milk droplets. The resultant crushed, frozen milk droplets consist essentially of a fine, free-flowing, frozen-solid milk powder at a temperature lower than $-25°$ C.

This fine frozen milk powder is placed in a cylindrical fluidization column precooled to below $-25°$ C. Precooling of the column is obtained by a wrapped encirclement of the column with a cloth containing fragments of solid carbon dioxide. Immediately after introduction of the frozen milk powder to the precooled column, a reduced pressure is pulled upon the column and its contents. When the system reaches an absolute pressure of 2 millimeters of mercury, substantially dry nitrogen gas is introduced in an amount to fluidize the frozen milk powder, while the system is maintained at an absolute pressure of less than about 4 millimeters of mercury. The nitrogen gas, after flowing through the fluidized frozen milk powder, is at a temperature of $-15°$ C. when it is removed from the system. To accelerate the drying, an attempt is made to introduce heat for sublimation of the ice content of the frozen milk powder by means of infrared heat lamps directed substantially on the column wall and the surface of the fluidized bed. At this time, the nitrogen gas exiting from the fluidized bed, is found to be of a temperature of about $-5°$ C., and some agglomeration of the milk powder is observed. Accordingly, no further effort is made to introduce heat for sublimation, and the heat lamps are shut off. Further fluidization of the milk powder, both the agglomerated and unagglomerated portions, is continued for an additional several hours, with the absolute pressure within the system being maintained at less than about 4 millimeters of mercury and with the temperature of the nitrogen gas exiting from the fluidized bed being about $-15°$ C. during the first two hours. No effort is made to precool the nitrogen gas being introduced into the system and, as fluidization continues during the next several hours, the temperature of the fluidizing gas removed from the column gradually climbs to a temperature of about 25° C. During this continued fluidization and additional freeze-drying of the fluidized, frozen milk powder, the absolute pressure within the system is maintained between 1 and 2½ millimeters of mercury. After 21 hours of fluidization and pulling of a reduced pressure on the system, both are discontinued and the contents of the column removed. The contents or product removed from the column are separated into two portions. One portion is an agglomerated mass equivalent to about one-third of the initially introduced milk powder and which, when removed, is still frozen but, when permitted to warm to room temperature, is a moist, pasty mass. The other portion of the contents removed is found to be small, dried pellets, apparently fibrous in nature, which crush and break easily into fragments. The dried portion, when permitted to come to room temperature, apparently is a product of adequate dryness for most purposes and does not have a moist surface. When resuspended in water by stirring for from 5 to 10 minutes, this dried product portion rehydrates to a reconstituted milk product of a substantially white color with a slight creamy tint. This reconstituted milk product tastes substantially like the originally purchased skim milk prior to freezing into droplets. It also is observed that the reconstituted milk product had small globules of butterfat dispersed throughout and in this respect also closely resembles the originally purchased skim milk.

*Example 2*

Skim milk consisting essentially of 0.1 percent by weight butterfat content and a total milk solids of 9 percent by weight, and a balance essentially of water, is added dropwise to liquid nitrogen, frozen into droplets, and the droplets crushed to a powder in the manner described in Example 1. The resulting frozen, crushed product is a fine, free-flowing frozen-solid milk powder of a temperature lower than about $-25°$ C.

This fine, free-flowing milk powder, while still at a temperature lower than $-25°$ C., is introduced into a precooled fluidization column of a temperature lower than $-25°$ C. from a wrapped encirclement of the column with a cloth containing fragments of solid carbon dioxide. Immediately, after addition of the frozen milk powder to the column, the column is evacuated and a precooled, and dry nitrogen gas is introduced to fluidize the frozen milk powder. The precooled, dry nitrogen gas introduced into the column is of a temperature lower than $-25°$ C. by passage through a heat-exchange coil which is immersed in an acetone-solid carbon dioxide mixture. At all times during this vacuum freeze-drying example, the introduced precooled nitrogen gas is maintained at a temperature lower than $-25°$ C. and the absolute pressure within the column also is maintained at less than 4 millimeters of mercury. Under these conditions, the frozen powdered milk is fluidized and vacuum freeze-dried until it reaches a moisture content of less than about 4 percent by weight. The resulting freeze-dried milk powder then is removed from the column. A portion of this dried milk powder is rehydrated by admixture with water and is found to provide a reconstituted skim milk substantially indistinguishable from the skim milk originally started with. Another portion of this dried skim milk powder is stored in a closed container under nitrogen for several weeks and then rehydrated by admixture with water and also found to be a reconstituted skim milk substantially indistinguishable from the skim milk originally started with and from the reconstituted skim milk prepared from the dried skim milk powder shortly after completion of the vacuum freeze-drying.

Example 3

An aqueous solution containing approximately 20 percent by weight of soluble constituents of roasted coffee beans is frozen solid. Freezing is in a vacuum cabinet, under a reduced pressure, by contact with a surface chilled by a Freon evaporator. The frozen-solid solution, now a thin frozen-solid sheet, is crushed to a fine powder, while still frozen solid. The resulting frozen-solid crushed product is a fine, free flowing, frozen-solid, coffee extract of a temperature lower than about —25° C.

This fine, free-flowing, frozen-solid coffee extract, while still at temperature lower than —25° C., is charged to a precooled fluidization column of a temperature lower than about —25° C. The column is evacuated and a precooled (below —25° C.), dry nitrogen gas is introduced to fluidize the charged, frozen-solid, crushed coffee extract. During this vacuum freeze drying example, the introduced precooled nitrogen gas is of a temperature lower than about —25° C., and the absolute pressure within the column during fluidization is maintained at less than 4 millimeters of mercury. Under these conditions, the fine, free-flowing, frozen-solid, coffee extract reaches a residual moisture content of less than about 2 percent by weight in less than about 48 hours. The resulting dried powder product is found to be storable under an inert atmosphere at about 25° C. for extended periods of time up to at least several months, and, after such storage, readily dissolves in hot water to form a palatable, drinkable coffee.

Example 4

A commercially available frozen orange juice concentrate is thawed sufficiently for removal from its container, then rapidly frozen at a temperature lower than —25° C., and crushed to a fine, free flowing, frozen-solid, orange juice concentrate of a temperature of lower than about —25° C.

This crushed, frozen-solid concentrate, while still frozen solid, is charged to a precooled fluidization column of a temperature lower than —25° C. The column is evacuated and the charged concentrate fluidized by introduction of a precooled substantially dry nitrogen gas of a temperature lower than about —25° C. Fluidization is carried forth for about 12 hours with the fluidized concentrate maintained at a temperature lower than about —25° C. and under a reduced absolute pressure of less than about 4 millimeters of mercury. At this time the resulting product, a dehydrated orange juice concentrate, is removed from the column. The dehydrated orange juice concentrate is thawed and found to have a water content significantly lower than the commercially available orange juice concentrate. Rehydration of this dried concentrate is readily accomplished by mixing with water. The reconstituted orange juice is found by a taste panel to be substantially indistinguishable from a similarly reconstituted orange juice prepared from the original commercially available frozen orange juice concentrate.

Example 5

About 150 parts of fresh carrots of a water content of about 113 parts by weight of water are diced and chopped to rough cubical shaped bits of a size ranging from about 1/32 of an inch on a side to about 1/8 of an inch on a side. These cubical shaped bits of carrots then are frozen solid by contact with liquid nitrogen.

While at a temperature lower than —30° C. the frozen solid carrot bits are charged to a precooled fluidization column of a temperature lower than about —30° C. The column is evacuated and the charged carrot bits fluidized by introducing a precooled dry nitrogen gas. During the initial several hours of fluidization, the carrot bits are fluidized under an absolute pressure of less than about 4 millimeters of mercury and during the entire fluidization the carrot bits are fluidized under a vapor pressure of less than about 4 millimeters of mercury. During the initial several hours of fluidization, the introduced precooled dry nitrogen gas is of a temperature of about —5° C. or lower. After the initial fluidization the introduced nitrogen gas is gradually warmed and, upon cessation of fluidization, the introduced nitrogen gas is of a temperature of about 30° C. Care is used as the introduced nitrogen gas is gradually increased in temperature by closely observing the fluidized bits to make certain that loss of the fluidized state does not result. After less than 4 hours of fluidization under these conditions, fluidization is discontinued and the carrot bits removed from the fluidization column. The dried carrot bits are found to have a residual moisture content of about 5 percent by weight. The dried carrot bits are observed to have retained their original color and apparently not to have shriveled or shrunk in size. A portion of the dried carrot bits upon cooking from 5 to 7 minutes in water is found to taste substantially the same as similarly diced and chopped fresh carrot bits cooked in an equivalent manner.

If diced carrot bits of a lower residual moisture level are desired, fluidization can be continued in the column for a longer period before removing the diced carrot bits or, alternatively, the removed diced carrot bits can be returned to the fluidization column and dried further by additional fluidizing under a vapor pressure of less than 4 millimeters of mercury.

Example 6

In a manner substantially like Example 5, fresh red beets are diced and chopped, frozen-solid, and dried while frozen solid in a fluidization column under a vapor pressure of less than 4 millimeters of mercury. The resultant dried beet bits after 5 hours of fluidization are of a residual water content of less than 4 percent by weight, while in comparison the fresh beets have a water content of about 88 percent by weight. Dried beet bits when prepared in this manner, and subsequently soaked in an aqueous vinegar and sugar solution, are found to be a quite tasty food.

Example 7

Frozen-solid kernels of freshly picked yellow sweet corn are fluidized in a fluidization column by precooled nitrogen gas of a vapor pressure of less than 1 millimeter of mercury and a temperature of less than —5° C. The fluidization chamber is maintained at a temperature less than 40° C. and an absolute pressure of less than 1 millimeter of mercury until the fluidized kernels reach a residual moisture content of less than 2 percent by weight. Approximately 7 hours are required for the fluidized kernels to reach this residual moisture content.

Example 8

Chicken meat is segmented to a size having a maximum dimension of the order of 1/4 to 1/2 inch. These chicken segments or pieces are rapidly frozen solid by a conventional means to a temperature lower than 0° C.

While frozen solid, the chicken pieces are introduced into a fluidization column maintained at a temperature lower than 0° C., and fluidized by a nitrogen gas of a temperature lower than 25° C., while maintaining the fluidized chicken pieces under an absolute pressure of about 2 millimeters of mercury. Under these conditions the chicken pieces are reduced to a residual moisture content of less than 4 percent in about 6 to 8 hours.

Thus, it has been shown that it is possible to fluidize a mass of discrete frozen solid particles of a material, which particles, when frozen, contain water in the form of ice, at a reduced pressure sufficient to sublime the ice content of the material and in this manner to provide a dehydrated material, which can be stored and then rehydrated to a high-quality reconstituted product. While this has been specifically illustrated with certain materials and at certain conditions, it is to be understood that various modifications will occur to those skilled in the art, and that all such modifications and variations which fall within the true scope of the invention are intended to be encompassed within the appended claims.

What is claimed is:
1. A method of freeze-drying a material, which when frozen solid contains water in the form of ice, which method includes:
 (a) maintaining a fluidized bed of discrete, frozen-solid particles of the material by passing a gas therethrough while maintaining the particles in a frozen-solid state and while maintaining a vapor pressure of less than about 4 millimeters of mercury on the fluidized mass of particles;
 (b) removing dried particles from said mass when said particles reach a desired residual moisture content.
2. A metod of freeze-drying a material, which when frozen solid contains water in the form of ice, which method includes the steps of:
 (a) reducing the material to discrete particles of a size suitable for fluidization;
 (b) freezing the discrete particles to a solid state;
 (c) maintaining a fluidized bed of discrete frozen-solid particles of the material by passing an inert gas therethrough while maintaining the particles in a frozen-solid state and while maintaining a water vapor partial pressure of less than about 4 millimeters of mercury on the fluidized bed of the particles; and
 (d) removing dried particles from the bed when the particles reach a desired residual moisture content.
3. The method of claim 2 in which the reducing of the material to a particulate form takes place preceding the freezing of the material to a solid state.
4. The method of claim 2 in which reducing of the material to a particulate form takes place subsequent to the freezing of the material to a solid state.
5. A method of removing water from a frozen food comprising the steps of:
 (a) introducing frozen food particles into a fluidization chamber;
 (b) maintaining a fluidized bed of the frozen food particles by passing therethrough an inert gas of a water vapor partial pressure of less than 4 millimeters of mercury, while maintaining the frozen food particles in a frozen-solid state and under a water vapor partial pressure of less than 4 millimeters of mercury;
 (c) removing the food particles from the fluidization chamber when the residual moisture content of said food particles is less than about 7 percent by weight.
6. The method of claim 5 employing frozen-solid particles of a fluid food of a eutectic composition, and in which the method includes the maintaining of said food particles in a frozen-solid state during fluidization by maintaining the particles at a temperature lower than the eutectic temperature of said composition.
7. The method of claim 6 in which the fluid food is orange juice.
8. The method of claim 6 in which the fluid food is a coffee extract.

9. A method of removing water from frozen particles of a liquid food of a eutectic composition, which method comprises the steps of:
 (a) freezing particulate portions of the liquid food to a temperature below the eutectic point of said eutectic composition;
 (b) comminuting the thus prepared particulate portions of the liquid food to a free flowing frozen-solid powder particles at a temperature below said eutectic point;
 (c) introducing the thus prepared free flowing frozen-solid powder particles into a fluidization chamber which is at a temperature below said eutectic point;
 (d) maintaining a fluidized bed of said introduced free flowing frozen-solid powder particles by passing therethrough an inert gas of a vapor pressure of less than 4 millimeters of mercury, while maintaining the particles in a frozezn solid state and under a water vapor partial pressure of less than 4 millimeters of mercury; and
 (e) removing the particles from the fluidization chamber when the residual moisture content of the particles is less than about 5 percent by weight.
10. A method of drying a frozen food comprising the steps of:
 (a) introducing frozen-solid particles of a food into a fluidization chamber;
 (b) maintaining a fluidized bed of the introduced particles with an inert gas of a water vapor partial pressure of less than 4 millimeters of mercury;
 (c) maintaining the fluidized particles in a frozen state and under an absolute pressure in the fluidization chamber of between about 0.001 and 4 millimeters of mercury; and
 (d) removing food particles from the fluidization chamber after they reach a desired residual moisture content while maintaining the removed particles under an inert atmosphere.
11. A method of freeze-drying a particulate material which in its natural state consists essentially of discrete particles of a size suitable for gas fluidization and which, when frozen solid, contains water in the form of ice, said method comprising the step of:
 (a) freezing discrete particles of the material to a solid state;
 (b) fluidizing a bed of discrete frozen-solid particles of the material by passing an inert gas therethrough while maintaining the discrete particles in a frozen-solid state and while maintaining a water vapor partial pressure of less than about 4 millimeters of mercury on the bed of fluidized particles; and
 (c) removing dried particles from the bed when the particles reach a desired residual moisture content.

References Cited by the Examiner
UNITED STATES PATENTS

| | | | |
|---|---|---|---|
| 2,435,503 | 2/1948 | Levinson | 34—5 |
| 2,467,318 | 4/1949 | Kellogg | 34—5 |
| 2,751,687 | 6/1956 | Colton | 34—5 |
| 2,836,368 | 5/1958 | McCoy | 34—5 X |
| 2,886,899 | 5/1959 | Watkins | 34—168 X |
| 3,089,253 | 5/1963 | Evans | 34—168 X |

ROBERT A. O'LEARY, *Primary Examiner.*

NORMAN YUDKOFF, *Examiner.*

W. E. WAYNER, *Assistant Examiner.*